United States Patent
Cochran et al.

(10) Patent No.: US 7,227,876 B1
(45) Date of Patent: Jun. 5, 2007

(54) FIFO BUFFER DEPTH ESTIMATION FOR ASYNCHRONOUS GAPPED PAYLOADS

(75) Inventors: Alexander John Cochran, North Vancouver (CA); Patrick Neil Bailey, Port Coquitlam (CA); Larrie S. Carr, Anmore (CA)

(73) Assignee: PMC-Sierra, Inc., Santa Clara, CA (US)

( * ) Notice: Subject to any disclaimer, the term of this patent is extended or adjusted under 35 U.S.C. 154(b) by 1142 days.

(21) Appl. No.: 10/321,582

(22) Filed: Dec. 18, 2002

Related U.S. Application Data (60) Provisional application No. 60/351,365, filed on Jan. 28, 2002.

(51) Int. Cl.
*H04J 3/06* (2006.01)
(52) U.S. Cl. ............... 370/509; 370/465; 370/412; 370/229; 370/506; 375/372
(58) Field of Classification Search ............ None
See application file for complete search history.

(56) References Cited

U.S. PATENT DOCUMENTS

| | | | |
|---|---|---|---|
| 4,888,739 A | 12/1989 | Frederick et al. | |
| 4,942,553 A | 7/1990 | Dalrymple et al. | |
| 5,157,655 A | 10/1992 | Hamlin, Jr. et al. | |
| 5,331,641 A | 7/1994 | Parruck et al. | |
| 5,548,534 A * | 8/1996 | Upp | 370/504 |
| 5,563,890 A * | 10/1996 | Freitas | 370/476 |
| 6,289,065 B1 | 9/2001 | Holt et al. | |
| 6,463,111 B1 * | 10/2002 | Upp | 375/372 |
| 6,744,787 B1 * | 6/2004 | Schatz et al. | 370/506 |
| 6,819,725 B1 * | 11/2004 | Oliver et al. | 375/371 |
| 6,836,854 B2 * | 12/2004 | Ranganath et al. | 713/503 |
| 6,982,995 B2 * | 1/2006 | Acimovic | 370/518 |
| 7,002,986 B1 * | 2/2006 | Roberts | 370/465 |
| 7,068,679 B1 * | 6/2006 | Brown et al. | 370/468 |
| 2003/0021287 A1 * | 1/2003 | Lee et al. | 370/442 |
| 2003/0227988 A1 * | 12/2003 | Subrahmanyan et al. | 375/372 |

* cited by examiner

*Primary Examiner*—Seema S. Rao
*Assistant Examiner*—Michael J. Moore
(74) *Attorney, Agent, or Firm*—Oyen Wiggs Green & Mutala LLP

(57) ABSTRACT

A desired FIFO buffer fill level is continuously derived during mapping or demapping of plesiosynchronous data signals into synchronized data signals, or vice-versa. One of j predefined integer values $I_i$ is repetitively consecutively produced during each consecutive one of j FIFO buffer write clock cycles, where i=1, . . . , j and where j and the integer values $I_i$ are selected such that $$\frac{\sum_{i=1}^{j} I_i}{j}$$

closely approximates the number of bits read from the FIFO buffer per FIFO buffer write clock cycle. During each $k^{th}$ consecutive FIFO buffer write clock cycle, a Bits_Read value $I_k+I_{k-1}$ is produced where k=1, . . . , p; a Bits_Written value is produced; a Gap_Pattern value is derived by subtracting the Bits_Read value from the Bits_Written value; and, the Gap_Pattern is added to a predefined value representative a FIFO buffer center fill level to produce the desired FIFO buffer fill level.

38 Claims, 7 Drawing Sheets

FIFO BUFFER DEPTH ESTIMATION FOR ASYNCHRONOUS GAPPED PAYLOADS

REFERENCE TO RELATED APPLICATION

This application claims the benefit of United States Provisional Patent Application Ser. No. 60/351,365 filed 28 Jan. 2002.

TECHNICAL FIELD

This invention relates to FIFO (first-in, first-out) buffer fill level (depth) tracking during mapping or demapping of plesiosynchronous data hierarchy (PDH) signals into synchronized data signals, or vice-versa.

BACKGROUND

Data signals are synchronized between asynchronous time domains by "mapping" them from one data rate to another. For example, plesiosynchronous signals such as DS3 signals characterized by a 44.736 Mb/s clock rate are commonly mapped from a plesiosynchronous link to a synchronous optical network/synchronous data hierarchy (SONET/SDH) link having a different characteristic clock rate such as the 1.728 Mb/s rate of the SONET virtual tributary 1.5 (VT1.5) signal. An electronic device known as a "mapper" performs the mapping operation. After transmission over the SONET/SDH link, the signal is desynchronized (demapped) by a "demapper" which reconverts the SONET/SDH signal to a plesiosynchronous signal for transmission over another plesiosynchronous link.

A FIFO buffer compensates for "gapped" data flow which occurs if data is written into the FIFO buffer at a uniform rate, but read from the FIFO buffer at a non-uniform rate; or, if data is written into the FIFO buffer at a non-uniform rate, but read from the FIFO buffer at a uniform rate. Specifically, FIFO buffers compensate for non-uniform data rates in DS3/E3-to-SONET mappers and in SONET-to-DS3/E3 demappers. For example, DS3/E3 data is written to or read from the FIFO buffer at a constant rate but, on the SONET clock domain, frame locations that contain no DS3 or E3 payload data (such as transport overhead, path overhead, and fixed stuff bit locations) result in gapped data flow to or from the FIFO buffer.

Figure 1:
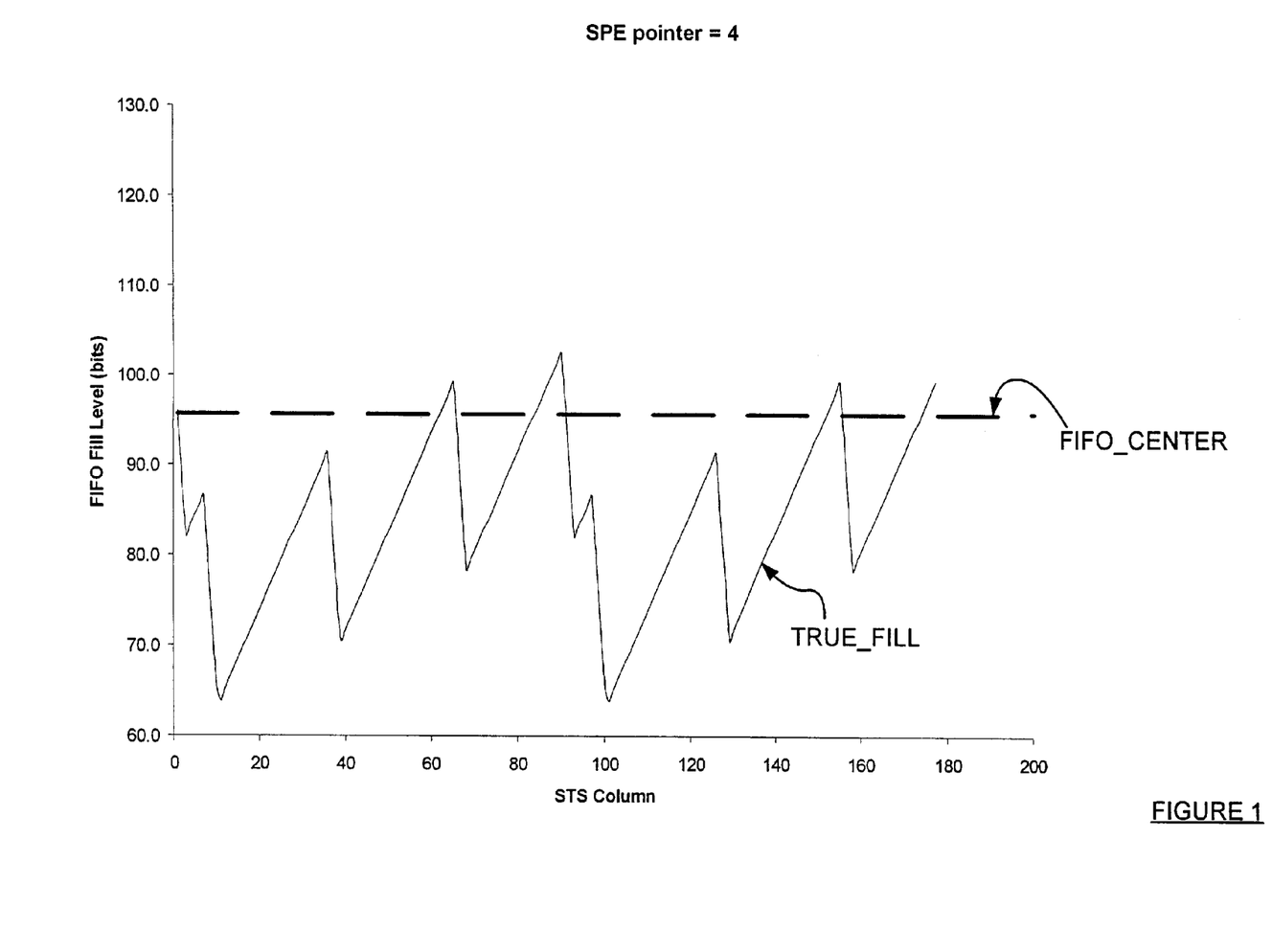
FIG. 1 graphically depicts FIFO buffer fill level (in bits) as a function of STS-1 column in a DS3 carried over AU-3 SONET mapping situation for the case in which the SPE pointer value is "4." At STS-1 column 10, the FIFO buffer fill is approximately 4 bytes below the FIFO buffer's center. At column 90, the FIFO buffer fill level is approximately 1 byte above the FIFO buffer's center.
Figure 2:
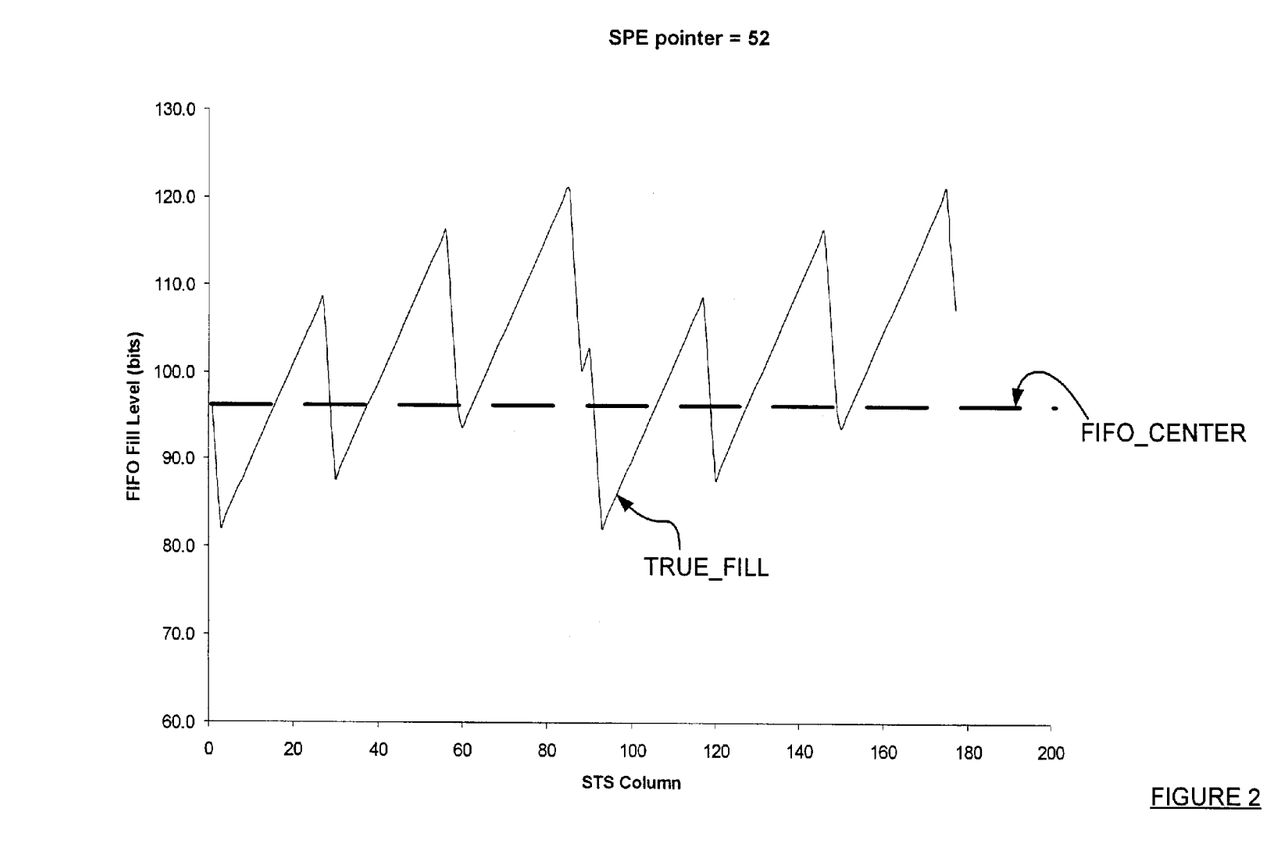
FIG. 2 graphically depicts FIFO buffer fill level (in bits) as a function of STS-1 column in a DS3 carried over AU-3 SONET mapping situation for the case in which the SPE pointer value is "52." At STS-1 column 2, the FIFO buffer fill is approximately 2 bytes below the FIFO buffer's center. At column 84, the FIFO buffer fill level is approximately 3 bytes above the FIFO buffer's center.

Ideally, the FIFO buffer's read address and write address pointers are adjusted to enable the FIFO buffer to absorb the maximum number of excess read or excess write operations which must be performed during gapped data flow situations to maintain synchronization of the data signals between the two asynchronous clock domains. However, gapped data flow causes periodic fluctuations in the FIFO buffer fill level, necessitating continual adjustment of the FIFO buffer's read address and write address pointers. In a DS3/E3 mapper or demapper, the periodic FIFO buffer fill level pattern repeats once per SONET row. The actual pattern depends on the payload mapping scheme and on the alignment of the synchronous payload envelope (SPE) within the SONET frame. For example, in applications where DS3 is carried by AU-3 SONET, the FIFO buffer fill level may drop as low as 4 bytes below the FIFO buffer's center (when the SPE pointer is set to 4, as shown in FIG. 1), or rise as high as 4 bytes above the FIFO buffer center (when the SPE pointer is set to 52, as shown in FIG. 2).

Figure 3:
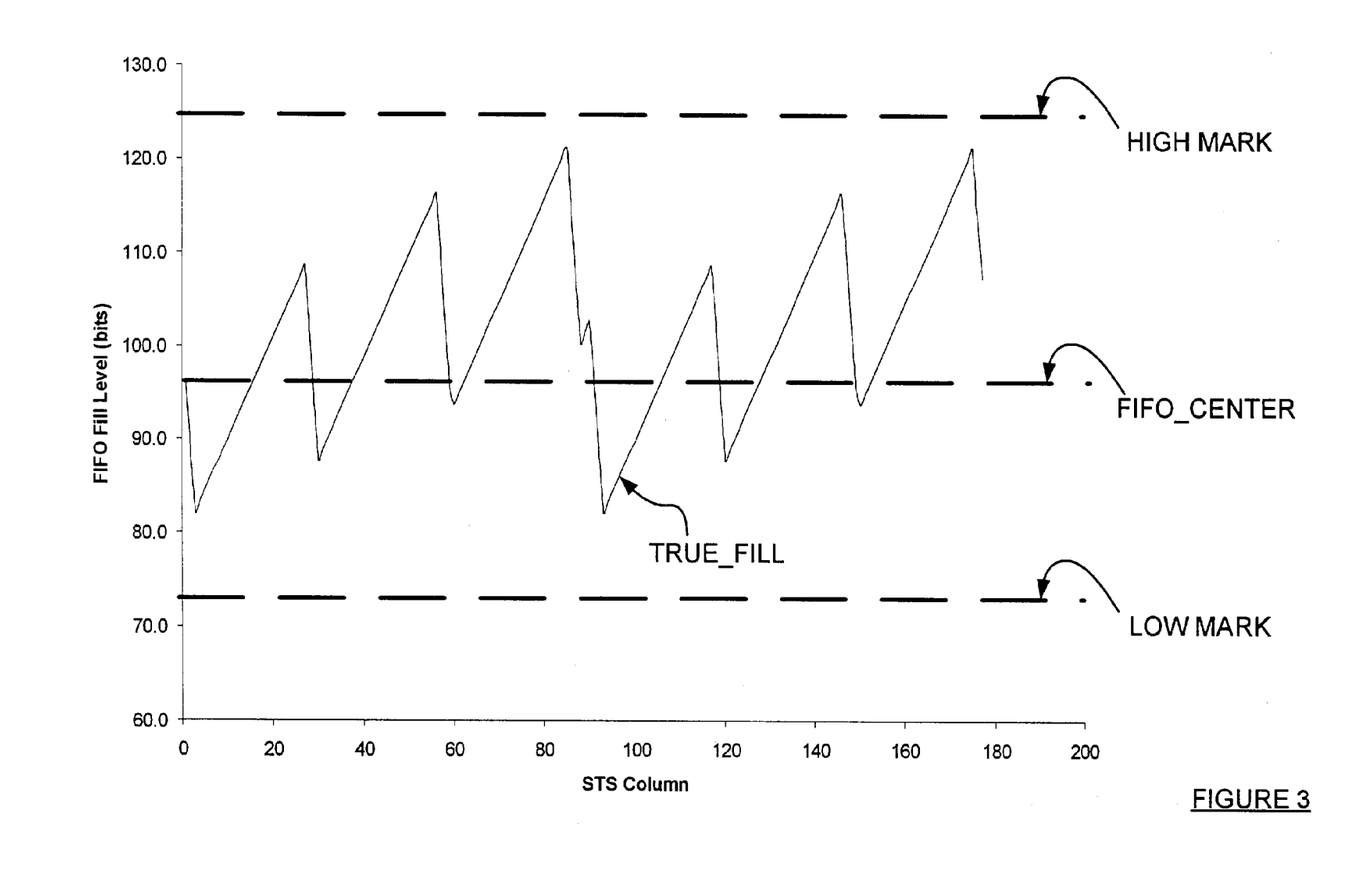
FIG. 3 graphically depicts high and low guard bands relative to a FIFO buffer's fill and center levels for two 90 column STS-1 rows.

One prior art method of adjusting the FIFO buffer's read address and write address pointers to compensate for FIFO buffer fill level fluctuations is to set high and low guard bands (FIG. 3) straddling the FIFO buffer's center. If the FIFO buffer fill level increases above the "high" guard band or decreases below the "low" guard band, action can be initiated to adjust the FIFO buffer fill level to prevent buffer under-runs or overflows. However, in SONET applications, the amplitude of the FIFO buffer fill level depends on the position of the SPE within the SONET frame. This requires an undesirably large FIFO buffer, in order to accommodate the entire range of FIFO buffer fill level amplitudes, and hence to prevent the FIFO buffer fill level from entering the guard band regions.

Another prior art technique employs hardware flags to indicate when a FIFO buffer is almost full, almost empty or half full. The flags can be monitored to determine the FIFO buffer's fill level, and utilized in a manner analogous to the above-described guard bands.

Another prior art approach uses the FIFO buffer fill level as a phase detector input for high order control loops. This method can be effective if high order control loops capable of closely tracking the incoming and outgoing data rates are used. However, high order control loops require larger settling times to track each new rate, which can cause the FIFO buffer fill level to shift up or down. High order control loops thus require larger FIFO buffers to prevent buffer under-runs or overflows. Although even higher order control loops can mitigate this effect, they may require significant stability analysis and are more complex.

SUMMARY OF THE INVENTION

The invention continuously derives a desired FIFO buffer fill level during mapping or demapping of plesiosynchronous data signals into synchronized data signals, or vice-versa. For example, and as is well known, the demapping operation is performed by extracting payload data bits from the input data stream, accumulating the extracted payload data bits until an n-bit payload data byte is accumulated, writing the payload data byte into the FIFO buffer during a FIFO buffer write clock cycle and then reading the payload data byte from the FIFO buffer during a FIFO buffer read clock cycle.

The invention repetitively consecutively produces one of j predefined integer values $I_i$ during each consecutive one of j FIFO buffer write clock cycles, where $i=1, \ldots, j$. The value of j and the integer values $I_i$ are selected such that $$\frac{\sum_{i=1}^{j} I_i}{j}$$

closely approximates the number of bits read from the FIFO buffer per FIFO buffer write clock cycle. For example, the input data stream may be a SONET/SDH data signal having p=90 columns per STS-1 row and the output data stream may be a DS3 data signal, in which case one may advantageously set $j=10$, $I_i=6$ for $i=1$, and $I_i=7$ for $i=2, \ldots, 10$ to yield $$\frac{\sum_{i=1}^{j} I_i}{j} = (6 + (9*7))/10 = 6.90,$$

closely approximating the average of 6.9037 bits actually read from the FIFO buffer per STS-1 write clock cycle in DS3 mode, assuming a nominal payload rate. As another example, the input data stream may be a SONET/SDH data signal (also having p=90 columns per STS-1 row) and the output data stream may be an E3 data signal, in which case one may advantageously set j=3, $I_1$=6, $I_2$=5, and $I_3$=5 to yield $$\frac{\sum_{i=1}^{j} I_i}{j} = (6+5+5)/3 = 5.3333,$$

closely approximating the average of 5.3037 bits actually read from the FIFO buffer per STS-1 write clock cycle in E3 mode, again assuming a nominal payload rate.

During each $k^{th}$ consecutive FIFO buffer write clock cycle, a Bits_Read value $I_k + I_{k-1}$ is produced where k=1, ..., p; a Bits_Written value is produced; a Gap_Pattern value is derived by subtracting the Bits_Read value from the Bits_Written value; and, the Gap_Pattern is added to a predefined constant representative of an ideal fixed operating FIFO buffer fill level to produce the desired FIFO buffer fill level.

A FIFO buffer fill error value is also derived during each $k^{th}$ consecutive FIFO buffer write clock cycle, by subtracting from a "true" FIFO buffer fill level representative of the difference between the FIFO buffer's write address and read address pointers, (i) the desired FIFO buffer fill level; and, (ii) a phase value representative of the accumulated phase due to SONET pointer justification events.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

An STS-1 to DS3/E3 demapper extracts E3 or DS3 payloads from VC-3 structures mapped into an STS-1 SPE via AU-3 or TUG-3 mapping schemes. In brief, during each STS-1 clock cycle, the demapper receives a VC-3 payload byte containing varying amounts of PDH DS3/E3 payload information. The DS3/E3 payload information is extracted and temporarily stored. The extracted DS3/E3 payload information is written into the FIFO buffer once a full byte of such information has been accumulated in the temporary storage location. Accordingly, DS3/E3 payload information bytes are written to the FIFO buffer at a non-uniform rate, not once per STS-1 clock cycle. That is, FIFO buffer write operations are "gapped" so that only full DS3/E3 payload information bytes are written to the FIFO buffer. Specifically, the demapper extracts the payload information bits from the incoming VC-3, assembles the extracted payload information bits into payload bytes, and writes the assembled payload bytes into a FIFO buffer using a 6.48 MHz (STS-1 byte rate) clock. A VC-3 payload byte mapped with DS3 data contains 0, 1, 5, or 8 DS3 payload information bits. A VC-3 payload byte mapped with E3 data contains 0, 1, 7, or 8 E3 payload information bits. Only DS3/E3 payload information bits are written into the FIFO buffer (not shown). Non-payload information bits, such as those used to accommodate SONET transport overhead factors, are not written into the FIFO buffer.

The assembled DS3/E3 payload information bytes are read from the FIFO buffer and output as a serial data stream using a parallel-in-serial-out (PISO) converter. The FIFO buffer read clock frequency is equal to the input PDH data rate, divided by 8. In DS3 mode, the FIFO buffer read clock is nominally a 44.736/8=5.592 MHz clock. In E3 mode, the FIFO buffer read clock frequency is nominally 34.368/8=4.926 MHz. Bytes of DS3/E3 data are read from the FIFO buffer every read clock cycle. Gapped data flow results, since DS3/E3 data bytes are written into the FIFO buffer at a non-uniform rate, but read from the FIFO buffer at a uniform rate.

On average, the rate at which data is written to the FIFO buffer equals the rate at which data is read from the FIFO buffer, in both DS3 and E3 modes of operation. In DS3 mode, assuming a nominal payload rate, the average number of bits written to the FIFO buffer per STS-1 clock cycle is approximately 5592 DS3 bits per frame/(9×90) STS-1 bytes per frame=6.9037 bits. Similarly, in E3 mode, the average number of bits written to the FIFO buffer per STS-1 clock is 4296 E3 bits per frame/(9×90) STS-1 bytes per frame=5.3037 bits. However, since FIFO buffer write operations are gapped as aforesaid, and since FIFO buffer read operations are constant (not gapped), the true instantaneous FIFO buffer fill level (the separation between the FIFO buffer's write address and read address pointers) fluctuates. Specifically, the instantaneous FIFO buffer fill level varies as a periodic function (waveform) having a period equal to one STS-1 row, relative to the FIFO buffer's fixed center value (labelled FIFO_Center in FIGS. 1, 2, 3, 5A and 6A). The amplitude of the variation of the instantaneous FIFO buffer fill level relative to the FIFO buffer center depends on the alignment of the SPE within the incoming STS-1, and on the DS3/E3 payload mapping scheme (i.e. AU-3 or TUG-3).

Figure 4:
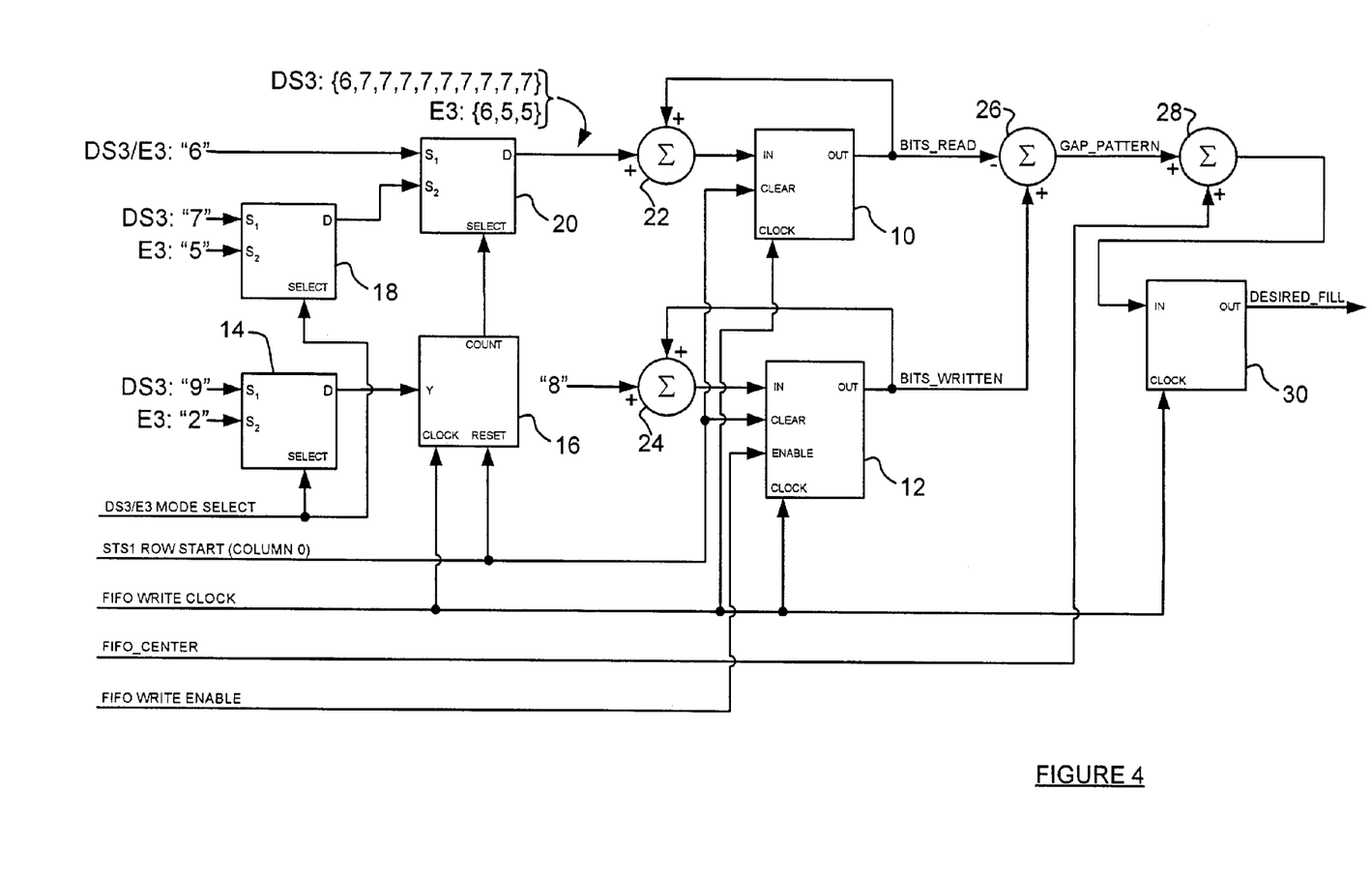
FIG. 4 schematically depicts circuitry for determining desired FIFO buffer fill level (Desired_Fill) in accordance with the invention.
Figure 7:
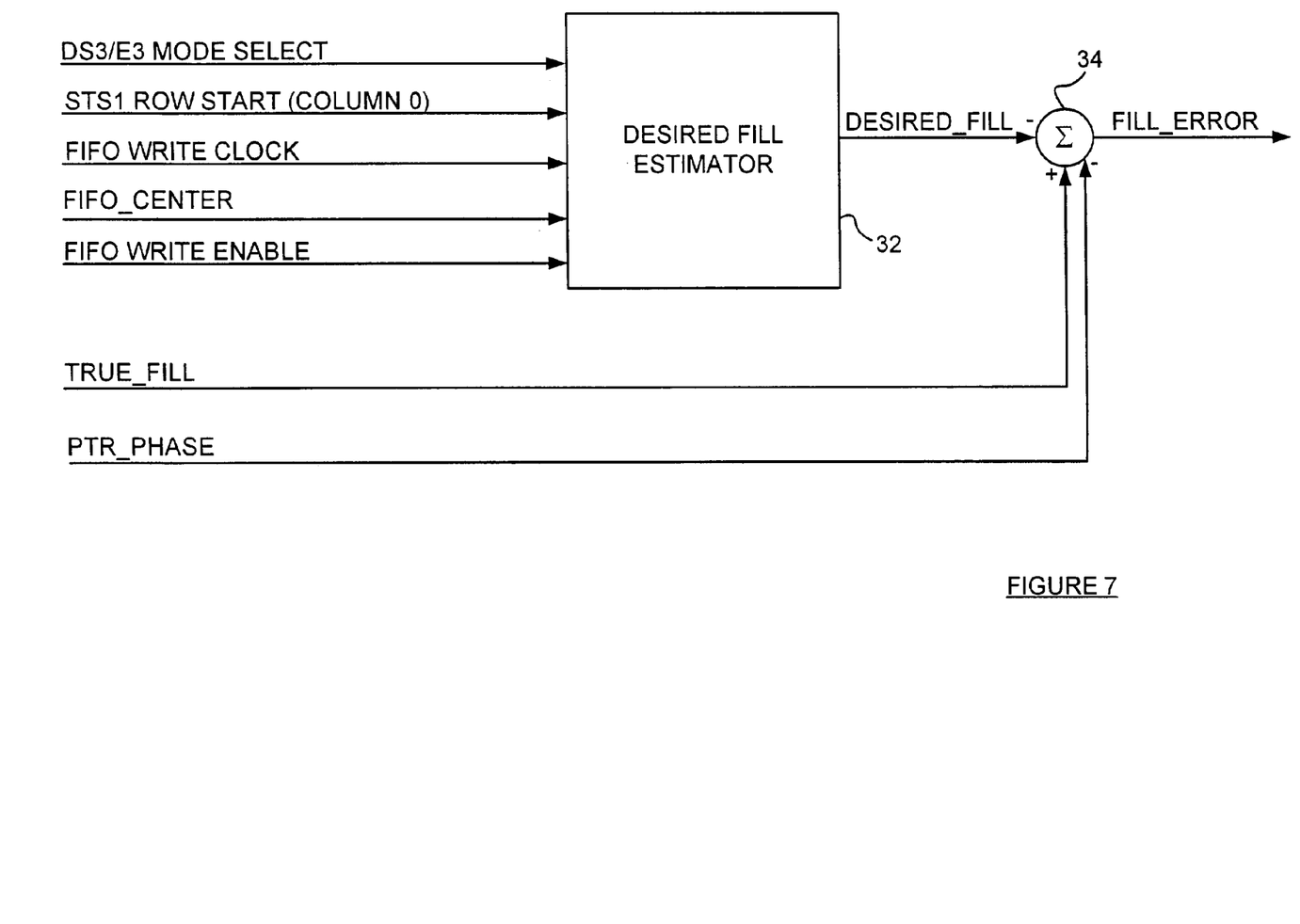
FIG. 7 schematically depicts circuitry for determining fill estimation error (Fill_Error) in accordance with the invention.

Each STS-1 frame has 783 possible SONET pointer positions. Each SONET pointer position corresponds to a different SPE alignment and to a distinct FIFO buffer true fill level periodic waveform. Instead of incurring the complexity and expense of storing and retrieving a separate waveform for each SONET pointer position, the invention approximates the demapper FIFO buffer's outgoing data rate to derive an approximation of the desired FIFO buffer fill level for any SONET pointer position, as shown in FIG. 4. As depicted in FIG. 7, the derived approximation is compared with the FIFO buffer true fill level, and the difference is output as an error indication which can be utilized by FIFO buffer centering logic to maintain a desired separation between the FIFO buffer's write address and read address pointers before buffer overflows or under-runs occur. The following terms are used to describe the invention:

| | |
|---|---|
| Bits_Written | Number of bits written to the FIFO buffer. This quantity, updated during every FIFO buffer write operation, is known exactly. |
| Bits_Read | Number of bits read from the FIFO buffer. This quantity, updated every write clock cycle, is an approximation. |
| Gap_Pattern | An approximation of the variation in FIFO buffer fill level caused by gapped payload write actions. This is a signed number, updated every write clock cycle. |
| Ptr_Phase | The amount of accumulated data, in bits, that is pending to be "leaked" due to SONET pointer justification events. When a negative justification occurs, the fill level temporarily rises. When a positive justification occurs, the fill level temporarily drops. This is a signed quantity, updated every write clock cycle, and is known exactly. |
| True_Fill | The difference between the FIFO buffer's write address pointer and the read address pointer (i.e. the amount of data stored in the FIFO buffer); updated every write clock cycle. |
| Desired_Fill | The ideal FIFO buffer fill level, at any STS-1 column position for any STS-1 SPE frame alignment or payload mapping scheme. |
| FIFO_Center | This value is a predefined constant representative of an ideal, fixed operating FIFO buffer fill level. The value is chosen such that for every possible STS-1 SPE frame alignment and DS3/E3 mapping scheme, fill level fluctuations do not cause buffer overflows or under-runs. |
| Fill_Error | The difference between the calculated Desired_Fill, Ptr_Phase and True_Fill values. This is a signed number, updated every write clock cycle. |

The "Gap_Pattern" approximation value is derived with the aid of accumulators 10, 12 (FIG. 4). As explained below, accumulator 10 outputs a "Bits_Read" cumulative total of the approximate number of bits read from the FIFO buffer and accumulator 12 outputs a "Bits_Written" cumulative total of the number of bits written to the FIFO buffer. The "FIFO buffer write clock" signal is applied to Bits_Read accumulator 10 once per STS-1 FIFO buffer write clock cycle in order to update its cumulative total once per STS-1 FIFO buffer write clock cycle. A FIFO buffer write operation occurs whenever the "FIFO buffer write clock" and "FIFO buffer write enable" signals are simultaneously applied to Bits_Written accumulator 12.

The D output port of first dual-input multiplexor 14 is connected to the Y input port of 0-to-Y rollover counter 16. The constant value "9" is continuously applied to multiplexor 14's first input port $S_1$. The constant value "2" is continuously applied to multiplexor 14's second input port $S_2$. A binary DS3/E3 mode select signal applied to multiplexor 14's SELECT port determines which one of multiplexor 14's input values "9" or "2" is asserted at multiplexor 14's D output port and applied to counter 16's Y input port. In DS3 mode, the binary signal applied to multiplexor 14's SELECT port results in application of the value "9" to counter 16's Y input port. In E3 mode, the binary signal applied to multiplexor 14's SELECT port results in application of the value "2" to counter 16's Y input port.

At the beginning of each STS-1 row, a reset signal is applied to counter 16's RESET port, resetting counter 16 to assert a value of zero at counter 16's COUNT output port. The value applied to counter 16's Y input port determines the number of consecutive clock cycles for which counter 16 counts incrementally before rolling the value output at its COUNT port over to zero to begin a fresh count. Thus, in DS3 mode, counter 16 outputs at its COUNT port, in sequence, one of the ten values {0, 1, 2, 3, 4, 5, 6, 7, 8, 9} during each of first through tenth consecutive FIFO buffer write clock cycles respectively, after which counter 16 rolls over to zero then sequentially outputs one of the same ten values for another ten consecutive FIFO buffer write clock cycles, etc. In E3 mode, counter 16 outputs at its COUNT port, in sequence, one of the three values {0, 1, 2} during each of first, second and third consecutive FIFO buffer write clock cycles respectively, after which counter 16 rolls over to zero then sequentially outputs one of the same three count values for another three consecutive FIFO buffer write clock cycles, etc.

The constant value "7" is continuously applied to second dual-input multiplexor 18's first input port $S_1$. The constant value "5" is continuously applied to multiplexor 18's second input port $S_2$. The constant value "6" is continuously applied to third dual-input multiplexor 20's first input port $S_1$. Multiplexor 18's D output port is connected to multiplexor 20's second input port $S_2$. The same binary DS3/E3 mode select signal applied to multiplexor 14's SELECT port is also applied to multiplexor 18's SELECT port, and determines which one of multiplexor 18's input values "7" or "5" is asserted at multiplexor 18's D output port and applied to multiplexor 20's second input port $S_2$. In DS3 mode, the binary signal applied to multiplexor 18's SELECT port results in application of the value "7" to multiplexor 20's $S_2$ input port. In E3 mode, the binary signal applied to multiplexor 18's SELECT port results in application of the value "5" to multiplexor 20's $S_2$ input port. The COUNT value output by counter 16 is applied to multiplexor 20's SELECT port. The value applied to multiplexor 20's $S_2$ input port is asserted at multiplexor 20's D output port as long as the value applied to multiplexor 20's SELECT port is non-zero. The value applied to multiplexor 20's $S_1$ input port is asserted at multiplexor 20's D output port as long as the value applied to multiplexor 20's SELECT port is zero.

In DS3 mode, during the first FIFO buffer write clock cycle, the COUNT value output by counter 16 is zero. Consequently, during the first FIFO buffer write clock cycle, multiplexor 20 outputs the value "6" in DS3 mode. During the second through tenth consecutive DS3 mode FIFO buffer write clock cycles, the COUNT value output by counter 16 is non-zero (i.e., the values {1, 2, 3, 4, 5, 6, 7, 8, 9} are consecutively output by counter 16 during the second through tenth cycles respectively). Consequently, in DS3 mode, during each of the second through tenth FIFO buffer write clock cycles, multiplexor 20 outputs the value "7". Accordingly, multiplexor 20 repeatedly outputs the sequence of ten values {6, 7, 7, 7, 7, 7, 7, 7, 7, 7} in DS3 mode.

In E3 mode, during the first FIFO buffer write clock cycle, the COUNT value output by counter 16 is zero. Consequently, during the first FIFO buffer write clock cycle, multiplexor 20 outputs the value "6" in E3 mode. During the second and third consecutive FIFO buffer write clock cycles, the E3 mode COUNT value output by counter 16 is non-zero (i.e., the values {1,2} are output by counter 16 during the second and third cycles respectively). Consequently, in E3 mode, during each of the second and third FIFO buffer write clock cycles, multiplexor 20 outputs the value "5". Accordingly, multiplexor 20 repeatedly outputs the sequence of three values {6, 5, 5} in E3 mode.

Multiplexor 20's D output port is connected to one of first adder 22's two "+" input ports. Adder 22's other "+" input port is connected to the OUT port of Bits_Read accumulator 10. Adder 22 adds the values asserted at its two input ports and applies the resultant total to the IN port of Bits_Read accumulator 10, which asserts that total at its OUT port on the next FIFO buffer write clock cycle as the Bits_Read value. The aforementioned STS-1 row start reset signal is applied to the CLEAR ports of Bits_Read accumulator 10 and Bits_Written accumulator 12, causing both accumulators to output a value of zero at the beginning of each STS-1 row.

In DS3 mode, multiplexor 20 consecutively outputs at its D output port one value from the sequence {6, 7, 7, 7, 7, 7, 7, 7, 7, 7} during each of ten consecutive DS3 mode FIFO buffer write clock cycles. Those values are added as aforesaid by adder 22 and Bits_Read accumulator 10, such that, on average, the Bits_Read value asserted at the OUT port of Bits_Read accumulator 10 during each of ten consecutive DS3 mode FIFO buffer write clock cycles is (6+(9*7))/10=6.90. This closely approximates the previously explained average of 6.9037 bits written to the FIFO buffer per STS-1 write clock cycle in DS3 mode, assuming a nominal payload rate.

In E3 mode, multiplexor 20 consecutively outputs at its D output port one value from the sequence {6, 5, 5} during each of three consecutive E3 mode FIFO buffer write clock cycles. Those values are added as aforesaid by adder 22 and Bits_Read accumulator 10, such that, on average, the Bits_Read value asserted at the OUT port of Bits_Read accumulator 10 during each FIFO buffer write clock cycle is (6+5+5)/3=5.3333 in E3 mode. This closely approximates the previously explained average of 5.3037 bits written to the FIFO buffer per STS-1 write clock cycle in E3 mode, assuming a nominal payload rate.

A constant value "8" is applied to one of second adder 24's two "+" input ports. Adder 24's other "+" input port is connected to the OUT port of Bits_Written accumulator 12. Adder 24 adds the values asserted at its two input ports and applies the resultant total to the IN port of Bits_Written accumulator 12, which asserts that total at its OUT port on the next clock cycle as the Bits_Written value. As previously explained, Bits_Written accumulator 12 is cleared (reset to zero) at the beginning of each STS-1 row. Once per FIFO buffer write operation, adder 24 adds the value "8" to Bits_Written accumulator 12's cumulative total (i.e. the Bits_Written value is incremented by 8 if the FIFO buffer write enable signal is applied to accumulator 12's ENABLE port during an STS-1 FIFO buffer write clock cycle) to reflect the fact that one 8-bit byte of DS3/E3 data has been written to the FIFO buffer. As previously explained, the FIFO buffer write operation is performed only if a full data byte is available to be written to the FIFO buffer; the write operation is not necessarily performed every write clock cycle. Accumulators 10, 12 are cleared (reset to zero) at the beginning of each STS-1 row to minimize round-off errors caused by approximating the Bits_Read value output by accumulator 10.

During each FIFO buffer write clock cycle, the instantaneous Bits_Read value output by accumulator 10 is applied to subtracter 26's "−" input port, the instantaneous Bits_Written value output by accumulator 12 is applied to subtracter 26's "+" input port, and subtracter 26 outputs the difference between those two input values as the instantaneous Gap_Pattern value (i.e., Gap_Pattern=Bits_Written−Bits_Read). Also during each FIFO buffer write clock cycle, the instantaneous Gap_Pattern value output by subtracter 26 is applied to one of adder 28's two "+" input ports, the predefined (constant) FIFO_Center value is applied to the other one of adder 28's "+" input ports, and adder 28 outputs the sum of those two input values. The summation value output by adder 28 is applied to the IN port of D-type flip flop 30. The FIFO buffer write clock signal is applied to flip flop 30's CLOCK port, causing flip flop 30 to output at its OUT port the Desired_Fill value in synchronization with the FIFO buffer write clock signal.

Figure 5A:
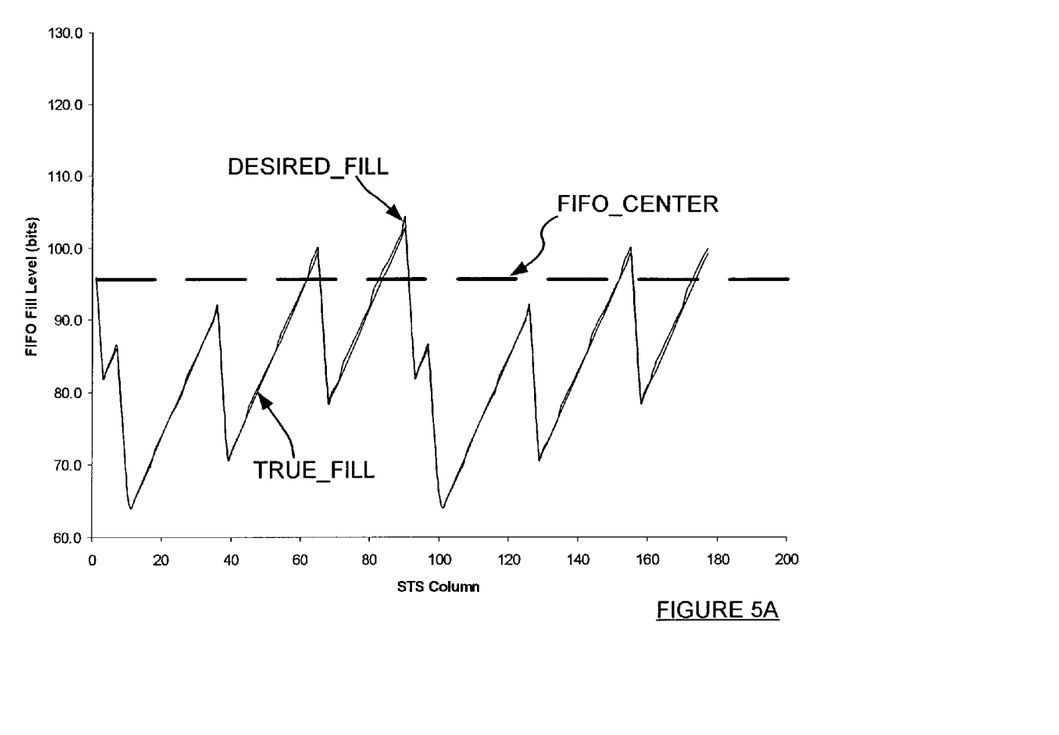
FIG. 5A is similar to FIG. 1, with the desired FIFO buffer fill level (Desired_Fill) determined in accordance with the invention superimposed.
Figure 5B:
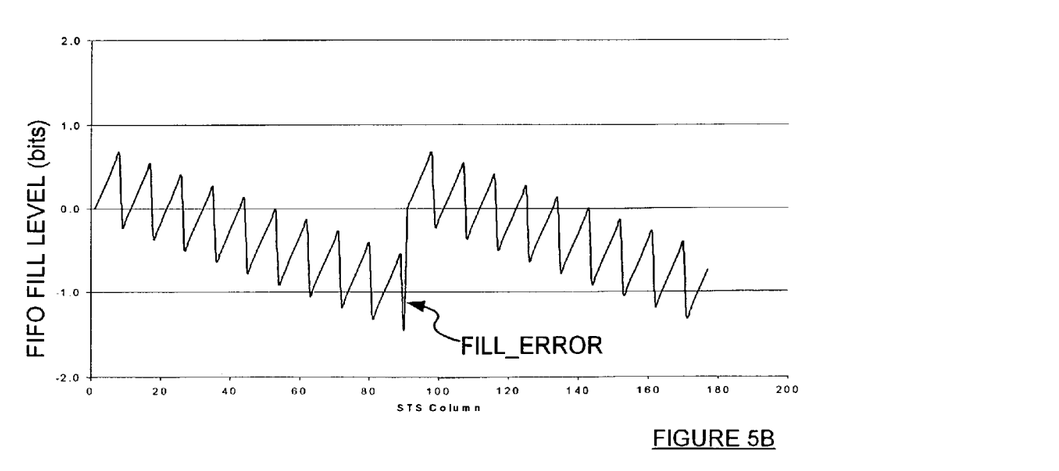
FIG. 5B graphically depicts the FIFO buffer fill estimation error (Fill_Error) corresponding to FIG. 5A.
Figure 6A:
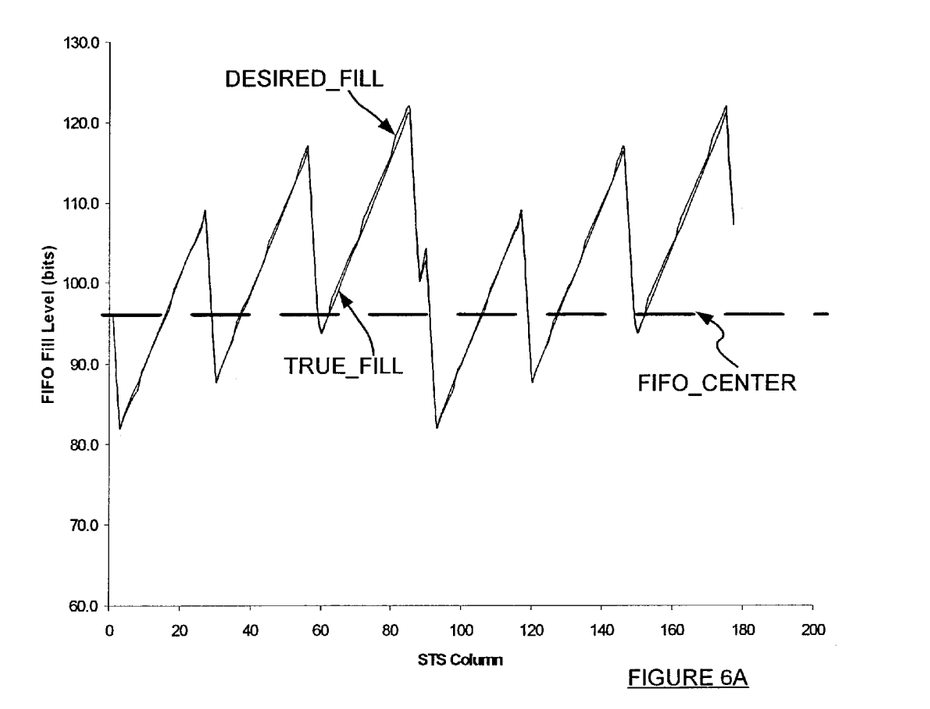
FIG. 6A is similar to FIG. 2, with the desired FIFO buffer fill level determined in accordance with the invention superimposed.
Figure 6B:
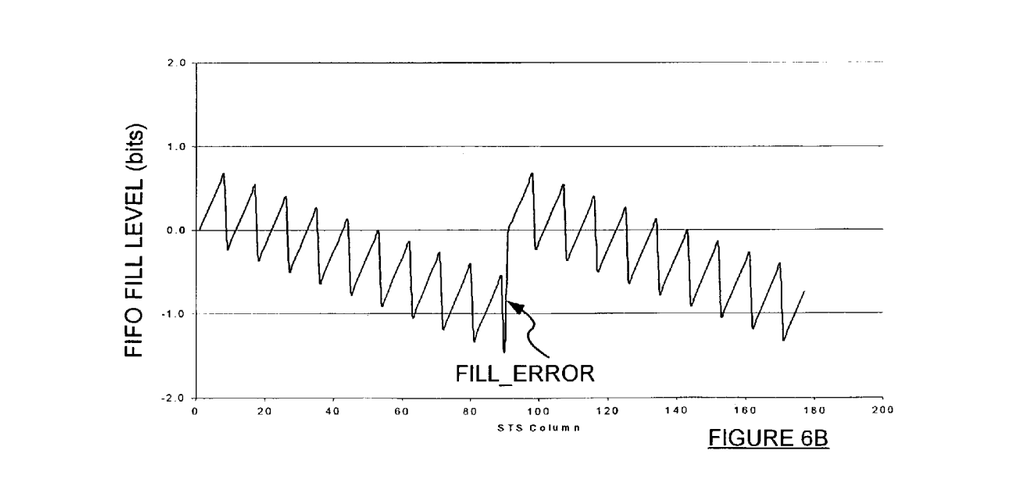
FIG. 6B graphically depicts the fill estimation error (Fill_Error) corresponding to FIG. 6A.

FIGS. 5A and 6A show Desired_Fill values, derived as aforesaid, superimposed on corresponding True_Fill values (obtained from the FIFO buffer controller—not shown), for the SPE frame alignments shown in FIGS. 1 and 2 respectively. The Fill_Error values graphically depicted in FIGS. 5B and 6B are derived using the equation Fill_Error=True_Fill−Desired_Fill and are adjusted by subtracting the pending data bits to be removed or added from the FIFO buffer to compensate for SONET pointer justification events, as explained below.

SONET pointers enable SPE movement across SONET/SDH frame boundaries. Frequency differences between network elements are handled by incrementing or decrementing the SONET pointer. This relocates the SPE within the SONET frame by adding an SPE byte to or subtracting an SPE byte from the SONET frame. Such SONET pointer justification events, which are not synchronized with the FIFO buffer read or write clocks, cause sudden phase changes which are absorbed by the FIFO buffer and reflected in the FIFO buffer fill level. This "excess" phase information is transient and has the effect of temporarily shifting the True_Fill pattern up or down. Excess phase information added to or subtracted from the FIFO buffer due to SONET pointer justification events is compensated for by the pointer processing logic (not shown). Determination of the aforementioned Fill_Error value necessitates removal of such excess phase information to prevent "double accounting" for such information by the demapper. The Fill_Error equation thus becomes Fill_Error=True_Fill−Desired_Fill−Ptr_Phase.

FIG. 7 depicts circuitry for determining the Fill_Error value. Block 32 represents the FIG. 4 circuitry, which outputs the Desired_Fill value, as aforesaid. Subtracter 34 subtracts both the Ptr_Phase value (obtained from the pointer processing logic—not shown) and the Desired_Fill value from the True_Fill value (obtained from the FIFO read and write address pointers—not shown) to produce the Fill_Error value. The Fill_Error value can be used to vary the frequency of the FIFO buffer read clock, and adjust the FIFO buffer write address and read address pointers until the Fill_Error value is minimized. The Fill_Error value may also be used to indicate impending FIFO buffer overflows or under-runs.

It can thus be seen that the invention facilitates maintenance of FIFO buffer fill levels during synchronization and desynchronization of signals between asynchronous clock domains, allowing FIFO buffer centering to be performed well in advance of overflow or under-run events. "Double accounting" of transient SONET pointer justification events, which temporarily shift the periodic FIFO buffer fill pattern above or below the FIFO buffer center, is prevented. The mapper and demapper FIFO buffers' desired fill levels are accurately estimated for all possible SPE frame alignments, independently of the DS3/E3 mapping scheme (TUG-3 or AU-3) and independently of the DS3/E3 payload rate (whether DS3 or E3).

As will be apparent to those skilled in the art in the light of the foregoing disclosure, many alterations and modifications are possible in the practice of this invention without departing from the spirit or scope thereof. For example, the Bits_Written, Bits_Read, and Ptr_Phase values are rounded up to the nearest byte since the FIFO buffer storage locations are byte-wide. As another example, the invention is readily adapted to use with serial (bit-wide) FIFO buffers, in which case the accuracy of the derived Fill_Error value is improved.

The FIG. 4 circuitry need not be capable of handling both DS3 and E3 signals, but can be simplified for handling only one type of signal. This can be achieved by removing multiplexors 14, 18. If only DS3 signals are to be handled, the constant value "7" is applied to multiplexor 20's input port $S_2$ and the constant value "9" is applied to counter 16's Y input. If only E3 signals are to be handled, the constant value "5" is applied to multiplexor 20's input port $S_2$ and the constant value "2" is applied to counter 16's Y input. The scope of the invention is to be construed in accordance with the substance defined by the following claims.

What is claimed is:

1. A method of deriving an estimate of a number of bits read from a FIFO buffer per FIFO buffer write clock cycle during demapping of an input data stream characterized by a first frequency to an output data stream characterized by a second frequency, said demapping comprising extracting payload data bits from said input data stream, accumulating said extracted payload data bits until an n-bit payload data byte is accumulated, writing said payload data byte into said FIFO buffer during one of said FIFO buffer write clock cycles and reading said payload data byte from said FIFO buffer during a FIFO buffer read clock cycle, said method comprising:
   (a) repetitively consecutively producing one of j predefined integer values $I_i$ during each consecutive one of j of said FIFO buffer write clock cycles, where i=1, . . . , j and wherein j and said integer values $I_i$ are selected such that $$\frac{\sum_{i=1}^{j} I_i}{j}$$

closely approximates said number of bits read from said FIFO buffer per FIFO buffer write clock cycle; and,
   (b) during each $k^{th}$ one of said FIFO buffer write clock cycles, outputting as said estimate of said number of bits read from said FIFO buffer per FIFO buffer write clock cycle, a value $I_k+I_{k-1}$, where k=1, . . . , p;
wherein i, j, k and p are integers.

2. A method as defined in claim 1, wherein said input data stream is a SONET/SDH data signal, said output data stream is a DS3 data signal and p is the number of columns per STS-1 row of said SONET/SDH data signal.

3. A method as defined in claim 2, wherein j=10, $I_i$=7 for i=1, $I_i$=7 for i=2, . . . , 10 and p=90.

4. A method as defined in claim 1, wherein said input data stream is a SONET/SDH data signal, said output data stream is an E3 data signal and p is the number of columns per STS-1 row of said SONET/SDH data signal.

5. A method as defined in claim 4, wherein j=3, $I_1$=6, $I_2$=5, $I_3$=5 and p=90.

6. A method of deriving a desired FIFO buffer fill level during demapping of an input data stream characterized by a first frequency to an output data stream characterized by a second frequency, said demapping comprising extracting payload data bits from said input data stream, accumulating said extracted payload data bits until an n-bit payload data byte is accumulated, writing said payload data byte into said FIFO buffer during a FIFO buffer write clock cycle and reading said payload data byte from said FIFO buffer during a FIFO buffer read clock cycle, said method comprising:
   (a) repetitively consecutively producing one of j predefined integer values $I_i$ during each consecutive one of j FIFO buffer write clock cycles, where i=1, . . . , j and wherein j and said integer values $I_i$ are selected such that $$\frac{\sum_{i=1}^{j} I_i}{j}$$

closely approximates the number of bits read from said FIFO buffer per FIFO buffer write clock cycle;
   (b) during each $k^{th}$ one of said FIFO buffer write clock cycles:
      (i) producing a Bits_Read value $I_k+I_{k-1}$, where k=1, . . . , p;
      (ii) producing a Bits_Written value;
      (iii) deriving a Gap_Pattern value by subtracting said Bits_Read value from said Bits_Written value; and,
      (iv) adding said Gap_Pattern to a predefined value representative of a FIFO buffer center fill level to produce said desired FIFO buffer fill level;
   wherein i, j, k and p are integers.

7. A method as defined in claim 6, wherein said input data stream is a SONET/SDH data signal, said output data stream is a DS3 data signal and p is the number of columns per STS-1 row of said SONET/SDH data signal.

8. A method as defined in claim 7, wherein j=10, $I_i$=6 for i=1, $I_i$=7 for i=2, . . . , 10 and p=90.

9. A method as defined in claim 6, wherein said input data stream is an SONET/SDH data signal, said output data stream is an E3 data signal and p is the number of columns per STS-1 row of said SONET/SDH data signal.

10. A method as defined in claim 9, wherein j=3, $I_1$=6, $I_2$=5, $I_3$=5 and p=90.

11. A method as defined in claim 6, further comprising during each $k^{th}$ one of said FIFO buffer write clock cycles deriving a FIFO buffer fill error value by subtracting from a true FIFO buffer fill level representative of the difference between read address and write address pointers of said FIFO buffer:
   (i) said desired FIFO buffer fill level; and,
   (ii) a phase value representative of the accumulated phase due to SONET pointer justification events.

12. Apparatus for deriving an estimate of a number of bits read from a FIFO buffer per FIFO buffer write clock cycle during demapping of an input data stream characterized by a first frequency to an output data stream characterized by a second frequency, said demapping comprising extracting payload data bits from said input data stream, accumulating said extracted payload data bits until an n-bit payload data byte is accumulated, writing said payload data byte into said FIFO buffer during one of said FIFO buffer write clock cycles and reading said payload data byte from said FIFO buffer during a FIFO buffer read clock cycle, said apparatus comprising:
  (a) a first multiplexor having a constant value $I_1$ applied to a first input port of said first multiplexor and having a constant value $I_2$ applied to a second input port of said first multiplexor;
  (b) a second multiplexor having a constant value $I_3$ applied to a first input port of said second multiplexor and having a constant value $I_4$ applied to a second input port of said second multiplexor;
  (c) a counter having an input port coupled to an output port of said first multiplexor;
  (d) a third multiplexor having a constant value $I_5$ applied to a first input port of said third multiplexor, having a second input port coupled to an output port of said second multiplexor, and having a select port coupled to an output port of said counter;
  (e) a first accumulator; and,
  (f) a first adder having a first summation port coupled to an output port of said third multiplexor, having a second summation port coupled to an output port of said first accumulator, and having an output port coupled to an input port of said first accumulator;
  wherein application of a FIFO buffer write clock signal to said counter and to said first accumulator produces said estimate at said first accumulator output port.

13. Apparatus as defined in claim 12, further comprising:
  (a) a second accumulator; and,
  (b) a second adder having a constant value $I_6$ applied to a first summation port of said second adder, having a second summation port coupled to an output port of said a second accumulator, and having an output port coupled to an input port of said second accumulator;
  wherein application of said FIFO buffer write clock signal to said second accumulator further produces, at said second accumulator output port, the number of bits written into said FIFO buffer per FIFO buffer write clock cycle.

14. Apparatus as defined in claim 13, wherein said input data stream is a SONET/SDH data signal, said output data stream is a DS3 data signal and a reset signal is applied to said counter, said first accumulator and said second accumulator at a predefined column of each STS-1 row of said SONET/SDH data signal.

15. Apparatus as defined in claim 13, wherein said input data stream is a SONET/SDH data signal, said output data stream is an E3 data signal and a reset signal is applied to said counter, said first accumulator and said second accumulator at a predefined column of each STS-1 row of said SONET/SDH data signal.

16. Apparatus as defined in claim 14, wherein $I_1=9$, $I_2=2$, $I_3=7$, $I_4=5$, $I_5=6$ and $I_6=8$.

17. Apparatus as defined in claim 15, wherein $I_1=9$, $I_2=2$, $I_3=7$, $I_4=5$, $I_5=6$ and $I_6=8$.

18. Apparatus as defined in claim 13, further comprising:
  (a) a third adder having a subtraction port coupled to said first accumulator output port and having a summation port coupled to said second accumulator output port;
  (b) a fourth adder having a first summation port coupled to an output port of said third adder and having a predefined value representative of a FIFO buffer center fill level applied to a second summation port of said fourth adder;
  wherein application of said FIFO buffer write clock signal to said counter, said first accumulator and said second accumulator, produces a desired FIFO buffer fill level value at an output port of said fourth adder.

19. Apparatus as defined in claim 18, further comprising a fifth adder having said desired FIFO buffer fill level value applied to a first subtraction port of said fifth adder, having a predefined value representative of a true FIFO buffer fill level representative of the difference between read address and write address pointers of said FIFO buffer applied to a first summation port of said fifth adder and having a predefined phase value representative of the phase due to SONET pointer justification events applied to a second subtraction port of said fifth adder.

20. A method of deriving an estimate of a number of bits written to a FIFO buffer per FIFO buffer read clock cycle during mapping of an input data stream characterized by a first frequency to an output data stream characterized by a second frequency, said mapping comprising receiving payload data bits from said input data stream, accumulating said received payload data bits until an n-bit payload data byte is accumulated, writing said payload data byte into said FIFO buffer during a FIFO buffer write clock cycle and reading said payload data byte from said FIFO buffer during one of said FIFO buffer read clock cycles, said method comprising:
  (a) repetitively consecutively producing one of j predefined integer values $I_i$ during each consecutive one of j of said FIFO buffer read clock cycles, where $i=1, \ldots, j$ and wherein j and said integer values $I_i$ are selected such that $$\frac{\sum_{i=1}^{j} I_i}{j}$$

closely approximates said number of bits written to said FIFO buffer per FIFO buffer read clock cycle; and,
  (b) during each $k^{th}$ one of said FIFO buffer read clock cycles, outputting as said estimate of said number of bits written to said FIFO buffer per FIFO buffer read clock cycle, a value $I_k+I_{k-1}$, where $k=1, \ldots, p$;
  wherein i, j, k and p are integers.

21. A method as defined in claim 20, wherein said output data stream is a SONET/SDH data signal, said input data stream is a DS3 data signal and p is the number of columns per STS-1 row of said SONET/SDH data signal.

22. A method as defined in claim 21, wherein $j=10$, $I_i=6$ for $i=1$, $I_i=7$ for $i=2, \ldots, 10$ and $p=90$.

23. A method as defined in claim 20, wherein said output data stream is a SONET/SDH data signal, said input data stream is an E3 data signal and p is the number of columns per STS-1 row of said SONET/SDH data signal.

24. A method as defined in claim 23, wherein $j=3$, $I_1=6$, $I_2=5$, $I_3=5$ and $p=90$.

25. A method of deriving a desired FIFO buffer fill level during mapping of an input data stream characterized by a first frequency to an output data stream characterized by a second frequency, said mapping comprising receiving payload data bits from said input data stream, accumulating said received payload data bits until an n-bit payload data byte is accumulated, writing said payload data byte into said FIFO buffer during a FIFO buffer write clock cycle and reading said payload data byte from said FIFO buffer during a FIFO buffer read clock cycle, said method comprising:
  (a) repetitively consecutively producing one of j predefined integer values $I_i$ during each consecutive one of j FIFO buffer read clock cycles, where i=1, . . . , j and wherein j and said integer values $I_i$ are selected such that $$\frac{\sum_{i=1}^{j} I_i}{j}$$

closely approximates the number of bits written to said FIFO buffer per FIFO buffer read clock cycle;
 (b) during each $k^{th}$ one of said FIFO buffer read clock cycles:
  (i) producing a Bits_Written value $I_k+I_{k-1}$, where k=1, . . . , p;
  (ii) producing a Bits_Read value;
  (iii) deriving a Gap_Pattern value by subtracting said Bits_Read value from said Bits_Written value; and,
  (iv) adding said Gap_Pattern to a predefined value representative of a FIFO buffer center fill level to produce said desired FIFO buffer fill level;
 wherein i, j, k and p are integers.

26. A method as defined in claim 25, wherein said output data stream is a SONET/SDH data signal, said input data stream is a DS3 data signal and p is the number of columns per STS-1 row of said SONET/SDH data signal.

27. A method as defined in claim 26, wherein j=10, $I_i$=6 for i=1, $I_i$=7 for i=2, . . . , 10 and p=90.

28. A method as defined in claim 25, wherein said output data stream is an SONET/SDH data signal, said input data stream is an E3 data signal and p is the number of columns per STS-1 row of said SONET/SDH data signal.

29. A method as defined in claim 28, wherein j=3, $I_1$=6, $I_2$=5, $I_3$=5 and p=90.

30. A method as defined in claim 25, further comprising during each $k^{th}$ one of said FIFO buffer read clock cycles deriving a FIFO buffer fill error value by subtracting from a true FIFO buffer fill level representative of the difference between read address and write address pointers of said FIFO buffer:
 (i) said desired FIFO buffer fill level; and,
 (ii) a phase value representative of the phase due to SONET pointer justification events.

31. Apparatus for deriving an estimate of a number of bits written into said FIFO buffer per FIFO buffer read clock cycle during mapping of an input data stream characterized by a first frequency to an output data stream characterized by a second frequency, said mapping comprising receiving payload data bits from said input data stream, accumulating said received payload data bits until an n-bit payload data byte is accumulated, writing said payload data byte into said FIFO buffer during one of a FIFO buffer write clock cycle and reading said payload data byte from said FIFO buffer during one of said FIFO buffer read clock cycles, said apparatus comprising:
 (a) a first multiplexor having a constant value $I_1$ applied to a first input port of said first multiplexor and having a constant value $I_2$ applied to a second input port of said first multiplexor;
 (b) a second multiplexor having a constant value $I_3$ applied to a first input port of said second multiplexor and having a constant value $I_4$ applied to a second input port of said second multiplexor;
 (c) a counter having an input port coupled to an output port of said first multiplexor;
 (d) a third multiplexor having a constant value $I_5$ applied to a first input port of said third multiplexor, having a second input port coupled to an output port of said second multiplexor, and having a select port coupled to an output port of said counter;
  (i) a first accumulator; and,
  (ii) a first adder having a first summation port coupled to an output port of said third multiplexor, having a second summation port coupled to an output port of said first accumulator, and having an output port coupled to an input port of said first accumulator;
 wherein application of a FIFO buffer read clock signal to said counter and to said first accumulator produces said estimate at said first accumulator output port.

32. Apparatus as defined in claim 31, further comprising:
 (a) a second accumulator; and,
 (b) a second adder having a constant value $I_6$ applied to a first summation port of said second adder, having a second summation port coupled to an output port of said a second accumulator, and having an output port coupled to an input port of said second accumulator;
 wherein application of said FIFO buffer read clock signal to said second accumulator further produces, at said second accumulator output port, the number of bits read from said FIFO buffer per FIFO buffer read clock cycle.

33. Apparatus as defined in claim 32, wherein said output data stream is a SONET/SDH data signal, said input data stream is a DS3 data signal and a reset signal is applied to said counter, said first accumulator and said second accumulator at a predefined column of each STS-1 row of said SONET/SDH data signal.

34. Apparatus as defined in claim 32, wherein said output data stream is a SONET/SDH data signal, said input data stream is an E3 data signal and a reset signal is applied to said counter, said first accumulator and said second accumulator at a predefined column of each STS-1 row of said SONET/SDH data signal.

35. Apparatus as defined in claim 33, wherein $I_1$=9, $I_2$=2, $I_3$=7, $I_4$=5, $I_5$=6 and $I_6$=8.

36. Apparatus as defined in claim 34, wherein $I_1$=9, $I_2$=2, $I_3$=7, $I_4$=5, $I_5$=6 and $I_6$=8.

37. Apparatus as defined in claim 32, further comprising:
 (a) a third adder having a subtraction port coupled to said second accumulator output port and having a summation port coupled to said first accumulator output port;
 (b) a fourth adder having a first summation port coupled to an output port of said third adder and having a predefined value representative a FIFO buffer center fill level applied to a second summation port of said fourth adder;
 wherein application of said FIFO buffer read clock signal to said counter, said first accumulator and said second accumulator, produces a desired FIFO buffer fill level value at an output port of said fourth adder.

38. Apparatus as defined in claim 37, further comprising a fifth adder having said desired FIFO buffer fill level value applied to a first subtraction port of said fifth adder, having a predefined value representative of a true FIFO buffer fill level representative of the difference between read address and write address pointers of said FIFO buffer applied to a first summation port of said fifth adder and having a predefined phase value representative of the phase due to SONET pointer justification events applied to a second subtraction port of said fifth adder.

* * * * *